Figure 3:
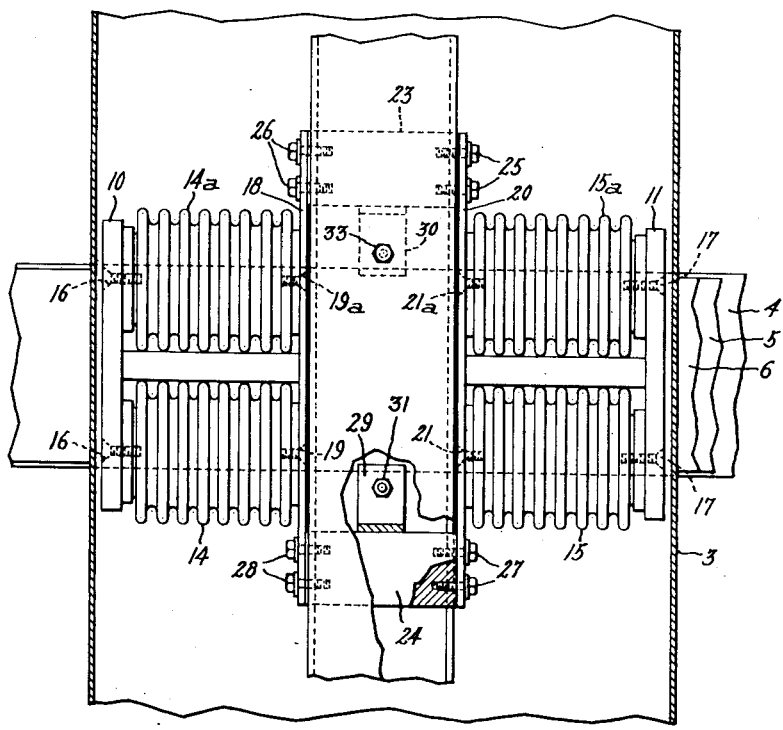

Oct. 9, 1951 — N. SWERDLOW ET AL — 2,570,885
ELECTRIC BUS SUPPORT
Filed June 4, 1949 — 2 Sheets-Sheet 1
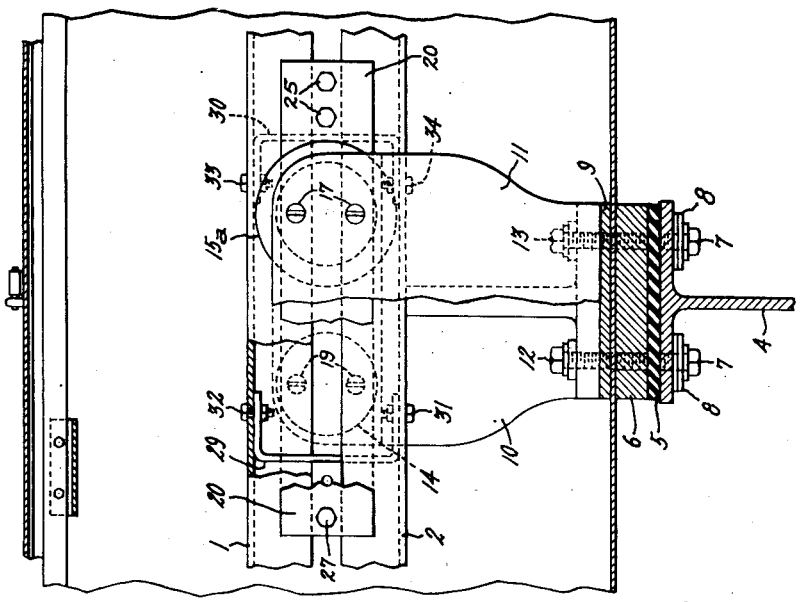
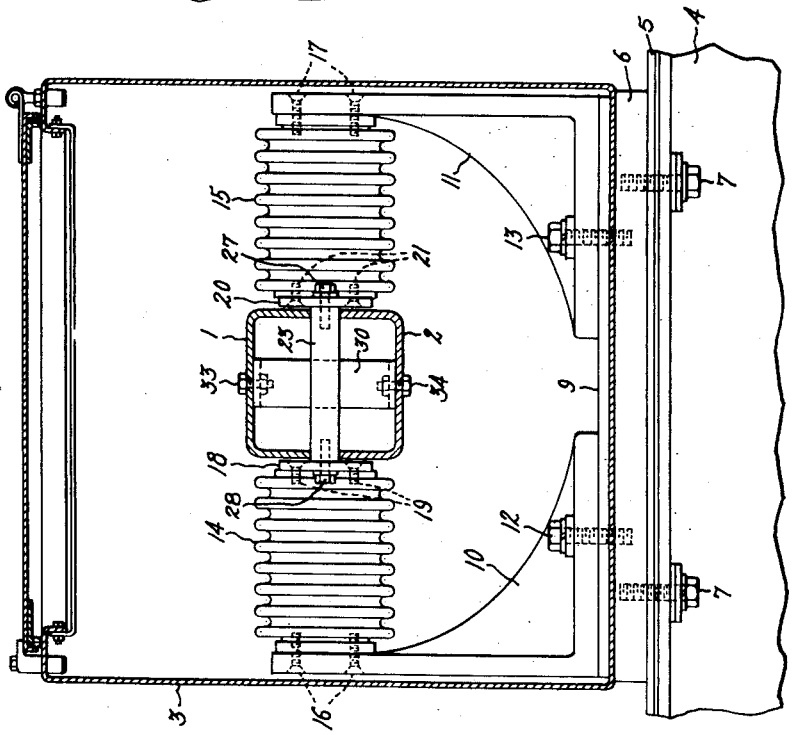
Inventors:
Nathan Swerdlow,
George G. Abel,
by Ernest F. Britton
Their Attorney.

Oct. 9, 1951 N. SWERDLOW ET AL 2,570,885
ELECTRIC BUS SUPPORT
Filed June 4, 1949 2 Sheets-Sheet 2

Inventors:
Nathan Swerdlow,
George G. Abel,
by Ernest C. Britton
Their Attorney.

Patented Oct. 9, 1951

2,570,885

UNITED STATES PATENT OFFICE 2,570,885

ELECTRIC BUS SUPPORT

Nathan Swerdlow, Philadelphia, and George G. Abel, Media, Pa., assignors to General Electric Company, a corporation of New York Application June 4, 1949, Serial No. 97,272

9 Claims. (Cl. 174—171)

This invention relates to electric bus support means and more particularly to resilient means for interrelating oppositely disposed supporting insulator structures with the bus itself in such a way as to minimize the tendency of the bus to impose high tensile stresses on certain of the supporting insulator structures due to the magnetic effects of short circuit currents flowing through the bus.

Our invention is particularly applicable to electric buses of the type disclosed in our application Serial No. 47,128, filed August 1, 1948, wherein a pair of axially aligned insulators arranged in opposition are supported by a pair of mounting brackets secured in spaced relation to a base structure and wherein the bus itself is interposed between and carried by the insulators. Whenever a heavy current short circuit occurs, the affected bus usually reacts with a strong sidewise thrust due to the magnetic forces developed under short circuit conditions.

It is well known that ceramic insulators are capable of withstanding relatively high compression loads but, due to the brittle nature of such insulators, they are not capable of withstanding correspondingly high tension forces.

One object of our invention is to provide an improved bus support means which accommodates sidewise thrust of the bus without damage to the supporting ceramic insulators.

Another object of our invention is the provision of means for distributing the side thrust of an electric bus in such a way as to avoid the application of excessively high tension forces to any of the bus supporting insulators.

In accordance with this invention an electric bus is carried at spaced intervals along its length between a pair of spaced coaxially disposed insulators whose outer ends are supported by semi-rigid fixed supporting brackets, and yieldable means interconnected between the coaxial insulators serves to support the bus in such a manner that whenever the bus exerts a strong sidewise thrust toward one of the insulators due to magnetic effects only a gradually increasing and limited tension force is produced upon the opposite coaxial insulator. The yieldable means also may constitute guide means for the bus so that the latter may slide thereon to accommodate axial expansion of the bus due to heating from high continuous or transient currents.

While we have shown and described our invention as applied to a metal enclosed isolated phase bus, it is not limited thereto and is applicable to high current electric bus installations which are not of the isolated phase type.

In the drawings, Fig. 1 is a transverse sectional view of an enclosed bus and its supporting structure: Fig. 2 is a side view of the arrangement shown in Fig. 1 with a portion of the bus and other parts of the supporting structure broken away; Fig. 3 is a top view of the structure shown in Figs. 1 and 2 with certain parts of the bus and other structure broken away.

As shown in the drawings, the bus comprises an electrically conducting channel 1 which cooperates with an oppositely disposed but similar channel 2. The bus and its supporting structure are enclosed within a metal sheath 3 provided with a suitable access door. Such sheathing and the bus therein are sectionalized into convenient lengths for manufacturing and installing in the field as described in the above mentioned application.

Also as is described in our above mentioned application, it may be desirable to insulate the sheath 3 and the bus supporting structure from the supporting I-beam 4. To this end, an insulating pad 5 may be interposed between a mounting block 6 and the I-beam 4. Bolts 7 which are screwed into block 6 may be insulated from I-beam 4 by means of washers 8 and suitable insulating sleeves (not shown) which insulate the bolt 7 from contact with the opening in I-beam 4 through which bolt 7 extends. Thus, the mounting block 6 is completely insulated from I-beam 4.

Disposed within the sheath 3 is a metallic mounting pad 9 which may be welded or otherwise secured to the bottom wall of the sheath. Mounting brackets 10 and 11 are disposed within the sheath 3 and the bolts 12 and 13 are screwed into the block 6 to secure the sheath 3 and the mounting brackets 10 and 11 rigidly in position to the fixed foundation structure. Although the metallic mounting brackets 10 and 11 are firmly secured at their bases to the mounting block 6, they possess inherent resiliency and thus are semi-rigid in construction to the extent that a slight sidewise movement of the upper region of the brackets from left to right, as viewed in Fig. 1, is possible. Thus, the mounting brackets 10 and 11 form a semi-rigid supporting base for the insulators 14, 14a, 15 and 15a. Insulators 14 and 14a are secured to mounting bracket 10 by the screws 16, while insulators 15 and 15a are secured to the mounting bracket 11 by means of screws 17. It will be obvious that for many installations only one insulator on each bracket would be sufficient such being the case with the bus construction disclosed in our above-mentioned application.

In accordance with the present invention, a resilient strap member 18 is secured to the inner surfaces of the insulators 14 and 14a by means of the screws 19 and 19a; while a corresponding resilient strap member 20 is secured to the inner surfaces of the correspondingly opposite insulators 15 and 15a by the screws 21 and 21a. The strap members should be constructed of steel or other suitable yieldable and resilient material. As has already been stated, the two insulators on each side of the bus are not necessary for certain installations, and one insulator on either side of the bus would be sufficient.

The ends of the strap members 18 and 20 are interconnected by means of spacer blocks 23 and 24 as best shown in Fig. 3. Spacer block 23 is secured to strap 20 by the bolts 25 and to the strap 18 by the bolts 26. The spacer block 24 is connected to strap 20 by bolts 27 and to strap 18 by the bolts 28. Bus sections 1 and 2 are held together in spaced relation with their inturned edges in engagement with spacer blocks 23 and 24 by suitable U-shaped spacer brackets 29 and 30. Spacer bracket 29 is bolted to bus channel 1 by means of bolt 32 and to the bus channel 2 by means of bolt 31. Spacer bracket 30 is secured to bus channel 1 by means of the bolt 33 and to bus channel 2 by means of the bolt 34. In the drawings the spacer brackets are shown abutting the respective spacer blocks. When so arranged axial movement of the bus with respect to the supporting structure is not possible, and so constitutes a "fixed" support. If the bight portion of spacer brackets 29 and 30 were moved out of engagement with blocks 24 and 23 respectively a "slip" support would be provided and the bus could expand axially. This could be accomplished by removing the bolts 31—34 and arranging the spacer brackets so that their bight portions are spaced from the blocks 23 and 24 before replacing bolts 31—34. In either case, the spacer brackets 29 and 30 would hold the inturned edges of bus channels 1 and 2 in engagement with the spacer blocks 23 and 24 and would thus secure the bus channels against vertical motion. With the spacer brackets out of engagement with the blocks 23 and 24, local shift of the bus in an axial direction would be possible because only a sliding contact would be provided between the inturned edges of bus channels 1 and 2 and the spacer blocks 23 and 24. In other words, no direct bolting would be provided between the bus channels and the bus supporting structure so that fixed or slip mounting is selectively provided for, depending upon whether the spacer brackets 29 and 30 are turned toward or away from the blocks 24 and 23 respectively.

With particular reference to Fig. 3, it will be understood that a strong sidewise thrust by the bus conductors to the right, for example, would tend to compress insulators 15 and 15a after first having closed up the slight clearance gap between the bus channels and strap 20 as shown in the drawing. If great enough, this force would bend the supporting bracket 11 somewhat so that the bus, together with insulators 15 and 15a, would move slightly closer to the enclosing wall of the sheath 3. This slight displacement would apply a tension stress to the spacer blocks 23 and 24 and thereby deflect the ends of the yieldable strap 18 toward the right. This movement toward the right of the ends of the strap 18 would not result in appreciable movement to the right of insulators 14 and 14a or of the upper end of bracket 10 because the strap 18 would flex along the overhung region between the bolts 19 and the bolts 28 and in the overhung region intermediate the bolts 19a and the bolts 26, it being understood that the strap 18 really constitutes a cantilever type leafspring and therefore is yieldable in response to less force than is required to bend the associated bracket 10. Thus, a major portion of the sidewise thrust to the right of the bus would be taken up by the application of compressive force to insulators 15 and 15a and but a small portion of this total thrust would be taken up by the application of tension force to the insulators 14 and 14a.

Because ceramic insulators are capable of withstanding large compressive force but are not adaptable to withstanding excessively high tension forces, our invention is effective to prevent breakage of insulators used to support electric buses by limiting the tension stresses to which they might otherwise be subjected.

It will be understood that the particular cross-sectional shape and disposition of the yieldable straps 18 and 20 together with the material from which these straps are constructed as well as the length of these straps between screws 19a and 26 and between screws 19 and 28 are the factors which would determine the extent to which the insulators are relieved of tension stress.

While we have shown and described a particular embodiment of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. Supporting structure for an electric bus comprising a semi-rigid supporting base structure, a pair of supporting insulators mounted on said base structure, said insulators being spaced apart and disposed on opposite sides of the bus, yieldable bus supporting means interposed between said insulators and secured thereto to limit the amount of tension force applied to one of said insulators when the bus exerts a sidewise thrust in a direction toward the other of said insulators, and means forming a sliding connection between said bus supporting means and the bus for accommodating limited axial movement of the bus and for interrelating the bus with said supporting means.

2. Supporting structure for an electric bus comprising a semi-rigid supporting base structure, a pair of supporting insulators mounted on said base structure, said insulators being spaced apart and disposed on opposite sides of the bus, yieldable means interposed between each of said insulators and the bus and secured to the corresponding insulator, means for interconnecting said yieldable means to form a support for the bus, and lost motion means for interrelating the bus and said means for interconnecting said yieldable means, said lost motion means being effective to accommodate limited axial movement of the bus with respect to said means for interconnecting said yieldable means, one of said yieldable means being operable to limit the amount of force applied to the associated one of said insulators when the bus exerts a sidewise thrust in a direction toward the other of said insulators.

3. Supporting structure for an electric bus comprising a semi-rigid supporting base structure, a pair of supporting insulators mounted on said base structure, said insulators being spaced apart and disposed on opposite sides of the bus, supporting means interposed between said insulators and secured thereto, and means forming a connection between the bus and said supporting means so as to accommodate movement of the bus with respect to said supporting means in a direction axially of the bus, said supporting means being yieldable to moderate the amount of force applied to one of said insulators when the bus exerts a sidewise thrust in a direction toward the other of said insulators.

4. Supporting structure for an electric bus comprising a pair of oppositely disposed supporting insulators spaced apart and mounted on semi-rigid supporting base structure, a resilient strap member secured to each of said support insulators, connecting means interposed between said strap members and secured thereto to form a supporting means for the bus, and means for interrelating said connecting means and the bus for securing the bus in position between said strap members, one of said strap members being caused to yield in a direction transverse with respect to the bus whenever the bus exerts a sidewise thrust toward the other of said strap members causing movement of said other strap member and its associated insulator.

5. Supporting structure for an electric bus comprising a pair of oppositely disposed supporting insulators spaced apart and mounted on semi-rigid supporting base structure, a resilient strap member secured to each of said support insulators at a point intermediate the ends of each strap member, connecting means interposed between the corresponding ends of said strap members and secured thereto to form a supporting means for the bus, and means forming a sliding connection between said connecting means and the bus for accommodating limited axial movement of the bus and for holding the bus in position between said strap members, one of said strap members being caused to yield in a direction transverse with respect to the bus whenever the bus exerts a sidewise thrust toward the other of said strap members causing movement of said other strap member and its associated insulator.

6. Supporting structure for an electric bus comprising semi-rigid supporting base structure, a pair of coaxially disposed supporting insulators mounted on said base structure, said insulators being spaced apart and positioned on opposite sides of the bus, a resilient strap member interposed between each insulator and the bus and secured to the adjacent insulator, connecting means interposed between said strap members and secured thereto to form a supporting means for the bus, and means forming a connection between said connecting means and the bus for holding the bus in position between said strap members, each of said strap members being yieldable in response to a smaller force than that required to cause said semi-rigid supporting base structure to yield so that sidewise thrust of the bus toward one of said insulators results in the application of a relatively high compressive force to said one insulator and a relatively low tension force to the other of said insulators due to yielding action of the one of said strap members associated with said other insulator.

7. Supporting structure for an electric bus comprising semi-rigid supporting base structure, a pair of coaxially disposed supporting insulators mounted on said base structure, said insulators being spaced apart and positioned on opposite sides of the bus, a resilient strap member secured to adjacent surfaces of said insulators at a point intermediate the ends of said strap members, and connecting means interposed between the corresponding ends of said strap members and secured thereto to form a supporting means for the bus, each of said strap members being yieldable in response to a smaller force than that required to cause said semi-rigid supporting base structure to yield so that sidewise thrust of the bus toward one of said insulators results in the application of a relatively high compressive force to said one insulator and a relatively low tension force to the other of said insulators due to yielding action of the one of said strap members associated with said other insulator.

8. Supporting structure for an electric bus comprising a pair of semi-rigid supporting brackets fixed in spaced relation, a supporting insulator secured to each bracket, said insulators being disposed on adjacent surfaces of said brackets with their adjacent surfaces spaced apart, a resilient strap member secured to said adjacent surface of each insulator, each of said strap members being yieldable in a direction toward the other of said strap members in response to a smaller force than is required to cause the corresponding one of said brackets to yield, and connecting means interposed between said strap members and secured thereto to form a supporting means for the bus.

9. Supporting structure for an electric bus comprising a pair of semi-rigid supporting brackets fixed in spaced relation, a supporting insulator secured to each bracket, said insulators being coaxially disposed with their confronting surfaces spaced apart, a resilient strap member secured intermediate the ends thereof to said confronting surface of each insulator, each of said strap members being yieldable in a direction toward the other of said strap members in response to a smaller force than is required to cause the corresponding one of said brackets to yield, connecting means interposed between corresponding ends of said strap members and secured thereto to form a supporting means for the bus, and means forming a slidable connection between said connecting means and the bus for maintaining the bus in position between said strap members and for accommodating axial movement of the bus with respect to said connecting means.

NATHAN SWERDLOW.
GEORGE G. ABEL.

REFERENCES CITED

The following references are of record in the file of this patent:

UNITED STATES PATENTS

| Number | Name | Date |
| --- | --- | --- |
| 2,396,131 | Scott | Mar. 5, 1946 |
| 2,428,051 | Touraton | Sept. 30, 1947 |